US009268732B2

(12) United States Patent
Glaser (10) Patent No.: US 9,268,732 B2
(45) Date of Patent: Feb. 23, 2016

(54) TUNNEL SUITABLE FOR MULTI-SEGMENT COMMUNICATION LINKS AND METHOD THEREFOR

(71) Applicant: Advanced Micro Devices, Inc., Sunnyvale, CA (US)

(72) Inventor: Stephen D. Glaser, San Francisco, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 346 days.

(21) Appl. No.: 13/893,901

(22) Filed: May 14, 2013

(65) Prior Publication Data

US 2013/0332634 A1 Dec. 12, 2013

Related U.S. Application Data (60) Provisional application No. 61/657,304, filed on Jun. 8, 2012.

(51) Int. Cl.
*G06F 13/00* (2006.01)
*G06F 13/42* (2006.01)

(52) U.S. Cl.
CPC .................................. *G06F 13/4286* (2013.01)

(58) Field of Classification Search
USPC ......................................................... 710/104
See application file for complete search history.

(56) References Cited

U.S. PATENT DOCUMENTS

| | | | |
|---|---|---|---|
| 5,239,632 A * | 8/1993 | Larner | 710/314 |
| 6,175,889 B1 * | 1/2001 | Olarig | 710/309 |
| 7,149,838 B2 * | 12/2006 | Ervin | 710/306 |
| 7,155,572 B2 | 12/2006 | Hughes | |
| 7,886,086 B2 * | 2/2011 | Sharma et al. | 710/29 |
| 8,463,881 B1 * | 6/2013 | Baker et al. | 709/220 |
| 8,917,734 B1 * | 12/2014 | Brown | 370/400 |
| 8,995,302 B1 * | 3/2015 | Brown et al. | 370/254 |
| 2003/0182482 A1 * | 9/2003 | Creta et al. | 710/104 |
| 2006/0195617 A1 * | 8/2006 | Arndt et al. | 710/1 |
| 2008/0239945 A1 * | 10/2008 | Gregg | 370/217 |
| 2012/0066428 A1 * | 3/2012 | Miyoshi | 710/311 |
| 2012/0324139 A1 * | 12/2012 | Glaser | 710/312 |
| 2013/0185472 A1 * | 7/2013 | Elboim et al. | 710/310 |

OTHER PUBLICATIONS

PCI-SIG, "PCI Express Base Specification", Revision 3.0, Nov. 10, 2010, 860 pages.
PCI-SIG, "PCI-to-PCI Bridge Architecture Specification", Revision 1.2, Jun. 9, 2003, 150 pages.

\* cited by examiner

*Primary Examiner* — Paul R Myers
(74) *Attorney, Agent, or Firm* — Polansky & Associates, P.L.L.C.; Paul J. Polansky (57) ABSTRACT

A tunnel for a communication system includes first and second bridges. The first bridge has a first port adapted to couple to a first link and a second port, and has a first programmable bus number and a first programmable function number. The second bridge has a first port coupled to the second port of the first bridge, and a second port, and has a second programmable bus number and a second programmable function number. In a hoist enabled mode, the first bridge forwards a packet on the first link to the second bridge if the second programmable bus number is equal to the first programmable bus number, a bus number of the packet is equal to the first programmable bus number, and a function number of the packet is equal to the second programmable function number.

27 Claims, 8 Drawing Sheets

TUNNEL SUITABLE FOR MULTI-SEGMENT COMMUNICATION LINKS AND METHOD THEREFOR

This application is a non-provisional application of and claims priority to U.S. Provisional Patent Application No. 61/657,304 filed on Jun. 8, 2012 and entitled "Tunnel Suitable for Multi-Segment Communication Links and Method Therefor," which is incorporated herein by reference in its entirety.

FIELD

This disclosure relates generally to computer buses, and more particularly to tunnels for computer data interconnects and related methods.

BACKGROUND

Many modern computing devices make use of input/output (I/O) adapters and buses that utilize some version or implementation of the Peripheral Component Interconnect (PCI) or PCI Express (PCIe) interconnect standards. The PCIe standard specifies a computer communication interconnect for attaching peripheral devices to a host computer. PCIe is an extension of the earlier PCI standard that uses existing PCI programming concepts, but bases the computer interconnect on a faster physical-layer communications protocol. The PCIe physical layer consists of dual uni-directional links between upstream and downstream devices.

Recently many devices connected using the PCIe standard now have a non-PCIe link in the communication path, which creates compatibility problems. For example, a PCIe compatible peripheral, such as a printer, may communicate with a host computer using PCIe over an intervening 802.11 wireless local area network. The PCIe standard addresses this possibility by defining PCIe switches (more generally referred to as tunnels) that are capable of isolating non-PCIe segments. Each of these tunnels has a PCIe port and a non-PCIe port, such that each tunnel can convert a PCIe packet into a non-PCIe packet or vice versa. Typically, two tunnels are utilized on a communication link that has a non-PCIe link. For packets originated by the host, the upstream tunnel converts PCIe packets to non-PCIe packets and the downstream tunnel receives the non-PCIe packets and converts them back to PCIe packets. For packets originated by the device, the tunnels reverse the flow. Unfortunately, during system configuration the root complex treats each tunnel port as a separate downstream device and assigns a unique identifier to each port.

The PCIe standard defines the identifiers as a combination of so-called "bus numbers" (to identify the point-to-point link segment since PCIe uses point-to-point links rather than buses), device Numbers, and function numbers. Because the PCIe standard requires downstream devices to have consecutively numbered bus numbers, the root complex typically assigns a range of bus numbers to the link to accommodate additional downstream PCIe devices which may be added after configuration. However, in today's world, many PCIe standard devices are connected to the root complex via downstream hubs such as wireless routers after configuration. Adding too many downstream devices can exhaust the pool of reserved bus numbers available for assignment, causing the system either to ignore the downstream devices added after all bus numbers are assigned, or to halt all operations and re-run the configuration process to reassign bus numbers before continuing operations.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

Embodiments of a system and method for configuring and routing packets on a multi-segment communication link between two devices will be described below. For example, a PCIe requester and a PCIe completer may communicate over a multi-segment communication link having an intervening non-PCIe link. In one embodiment, a PCIe tunnel provides a hoist extended capability which may be enabled during configuration and which allows the PCIe tunnel to respond to hoisted identifiers made up of both a PCIe bus number and a PCIe function number. In another embodiment, the tunnel provides abstract link extended capability values which allow the root complex to retrieve generic attributes of the non-standard link from the tunnel's configuration space, and configure the PCIe link based on the generic information.

Figure 1:
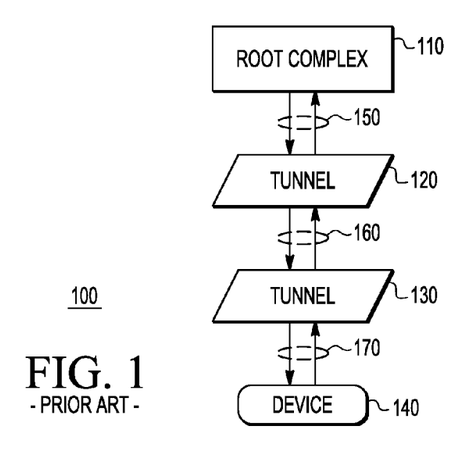
FIG. 1 illustrates in block diagram form a system for routing a PCIe packet over a non-PCIe link according to the prior art.

FIG. 1 illustrates in block diagram form a system 100 for routing a PCIe packet over a non-PCIe link according to the prior art. System 100 includes a root complex 110, tunnels 120 and 130, and a device 140. Root complex 110 has a downstream root port for connection to a PCIe link 150. Tunnel 120 has an upstream port connected to PCIe link 150, and a downstream port for connection to a non-PCIe bus 160. Tunnel 130 has an upstream port connected to non-PCIe bus 160, and a downstream port for connection to a PCIe link 170. Device 140 has a port connected to PCIe link 170.

In operation, root complex 110 sends PCIe requests to and receives PCIe completions from device 140 via tunnels 120 and 130. Root complex 110 sends a request to tunnel 120 over link 150, which is a standard PCIe communication link. Tunnel 120 converts the PCIe request to one or more corresponding non-PCIe data packets and sends them over bus 160. For example, tunnel 120 may convert the PCIe request into an 802.11 data packet for transmission over a wireless network. Tunnel 130 receives the non-PCIe packet or packets from bus 150 and converts it or them back into a PCIe format request packet, and provides the PCIe format request packet to device 140 over link 170. Device 140 then processes the request using standard PCIe protocol, and typically returns a completion packet that flows back to root complex 110 in reverse through tunnels 130 and 120.

Device 140 may also send PCIe requests to root complex 110 via tunnels 130 and 120. In response, root complex 110 sends completion packets in reverse through tunnels 120 and 130 to device 140.

In order to support end-to-end PCIe communication over this multi-segment link, tunnels 120 and 130 perform bridging functions that make root complex 110 and device 140 think they are communicating over a PCIe link using standard PCIe protocol. In particular, root complex 110 assumes that the whole path looks like PCIe link 150, and device 140 assumes that the whole path looks like PCIe link 170. However the bridging functions will necessarily be complex due to incompatibilities in link characteristics such as link width, link bandwidth, and added latency. For example, PCIe has a scalable physical layer in which the link width can be negotiated to be ×1, ×2, ×4, ×8, and ×16, but the non-PCIe link may have a fixed width. The extra segments also add end-to-end latency. Additional compatibility issues include per-lane equalization and hot-plug capability.

In order to perform the bridging functions over non-PCIe links, known tunnels associate the non-standard protocol to the closest standard PCIe match. For example, a 1 giga-transfer per second (1 GT/s) link might claim to be a ×1 link at 2.5 GT/s. However these associations become more complex and difficult to manage as link transfer rates become higher.

Moreover the PCIe protocol requires that root complex 110 enumerate the system and assign bus numbers (to identify the point-to-point links), device numbers, and function numbers to different devices and switches as it discovers them. The additional link segments require root complex 110 to assign downstream bus numbers to the non-standard links. With highly complex systems and systems in which devices are added and removed dynamically, it becomes difficult to assign bus numbers appropriately. For example, root complex 110 may discover a wireless router to which it assigns a bus number, and provides additional downstream bus numbers below it in the hierarchy. However if too many PCIe compatible devices connect to the link, the wireless router may run out of downstream bus numbers assigned to it to support the newly added devices. In that case, system 100 may either ignore the newly added devices, or stop all communications and enumerate itself again to accommodate these additional devices and buses.

On the other hand, PCIe allows a total of 255 downstream bus numbers in the system. If the root complex were to assign too many downstream bus numbers to each link segment, then it may run out of bus numbers to assign to additional switch ports. This problem becomes more likely as systems become more complex.

In order to overcome this tradeoff, some embodiments provide a system for identifier numbering that expands the number of possible downstream links without consuming too many of the limited bus numbers. This system uses "hoisted" bridges to overcome the normal 255 bus number limit of PCIe. In order to understand hoisted bridges, it is first helpful to understand how a conventional PCIe system enumerates itself and assigns identifiers to multi-segment links, which will now be described.

Figure 2:
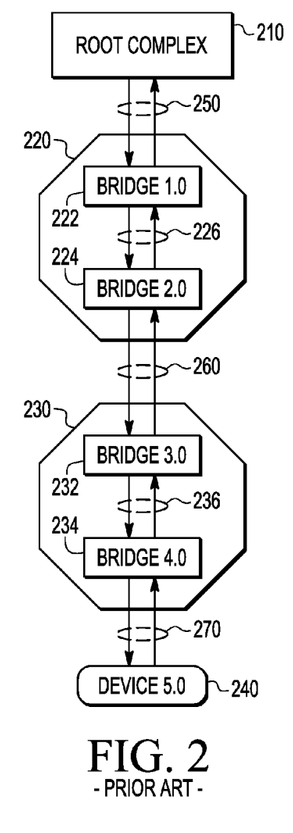
FIG. 2 illustrates in block diagram form a multi-segment link after enumeration.

FIG. 2 illustrates in block diagram form a multi-segment link system 200 after enumeration. System 200 corresponds to system 100 of FIG. 1 but shows additional details of the tunnels. System 200 includes root complex 210, tunnels 220 and 230, and a device 240. To understand the assignment of identifiers, system 200 shows that tunnel 220 includes an upstream bridge 222, a downstream bridge 224, and an internal link 226, and tunnel 230 includes an upstream bridge 232, a downstream bridge 234, and an internal link 236.

Root complex 210 has a root port for connection to a PCIe link 250. Upstream bridge 222 has an upstream port connected to PCIe link 250, and a downstream port connected to internal bus 226. Downstream bridge 224 has an upstream port connected to internal bus 226, and a downstream port connected to a non-PCIe link 260. Upstream bridge 232 of tunnel 230 has an upstream port connected to non-PCIe link 260, and a downstream port connected to internal bus 236. Downstream bridge 234 has an upstream port connected to internal bus 236, and a downstream port connected to a PCIe link 270. Device 240 has a port connected to PCIe link 270.

In operation, root complex 210 and device 240 communicate as described for corresponding elements of system 100 above. During configuration, root complex 210 enumerates system 200 by assigning bus, device, and function numbers to each bridge and device it discovers. According to the PCIe standard, all downstream devices, including bridges, have consecutively ordered bus, device, and function numbers, starting from the lowest available numbers. As illustrated in FIG. 2, root complex 210 has enumerated system 200 and assigned bus numbers to point-to-point links. During enumeration, the bridge "captures" its own bus number, known as the primary bus number, and a secondary bus number which is the immediately downstream bus number, and stores them in locations in its configuration space. The bridge also captures a value known as a subordinate bus number, which represents the highest number bus "behind" the bridge. Thus in system 200, root complex 210 assigns bus number 1 and function number 0 to bridge 222, indicated by convention as "1.0". Root complex 210 assigns bus number 2 and function 0 to bridge 224 (2.0), bus number 3 and function number 0 to bridge 234 (3.0), bus number 4 and device number 0 to bridge 234 (4.0), and bus number 5 and function number 0 to device 140 (5.0). Thus, root complex 210 requires five bus numbers for the simple multi-segment link between root complex 210 and device 240. The number of bus numbers assigned will increase as system complexity increases, leaving fewer bus numbers available for system expansion.

After configuration, when using ID-based routing, the tunnel compares the bus number of a request to see if it falls between its secondary bus number and its subordinate bus number. If so, it claims the packet and routes it appropriately.

Hoist Extended Capability

Figure 3:
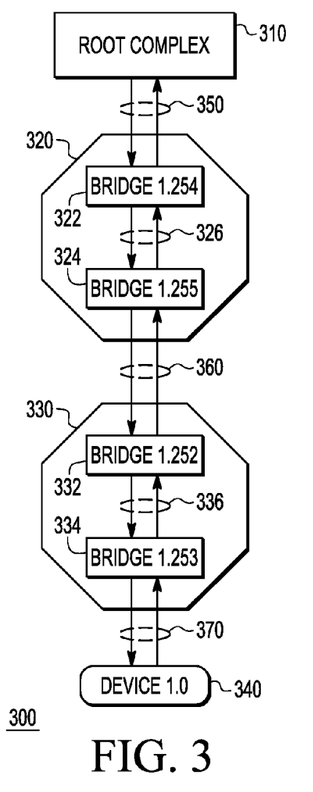
FIG. 3 illustrates in block diagram form a multi-segment link system after enumeration using hoisted identifiers according to the present invention, according to some embodiments.

FIG. 3 illustrates in block diagram form a multi-segment link system 300 after enumeration using hoisted identifiers according to some embodiments. System 300 includes a root complex 310, tunnels 320 and 330, and a device 340. Tunnel 320 includes an upstream bridge 322, a downstream bridge 324, and an internal bus 326. Tunnel 330 also includes an upstream bridge 332, a downstream bridge 334, and an internal bus 336.

Root complex 310 has a downstream root port for connection to a PCIe link 350. Upstream bridge 322 has an upstream port connected to PCIe link 350, and a downstream port connected to internal bus 326. Downstream bridge 324 has an upstream port connected to internal bus 326, and a downstream port connected to a non-PCIe link 360. Upstream bridge 332 of tunnel 330 has an upstream port connected to non-PCIe link 360, and a downstream port connected to internal bus 336. Downstream bridge 334 has an upstream port connected to internal bus 336, and a downstream port connected to a PCIe link 370. Device 340 has a port connected to PCIe link 370.

In operation, root complex 310 and device 340 generally communicate as described for corresponding elements of systems 100 and 200 above. However, unlike system 200 of FIG. 2, system 300 includes root complex 310 and tunnels 320 and 330 with hoisted identifier capability. When hoisted identifier capability is supported on root complex 310 and on the additional downstream devices and tunnels, root complex 310 assigns hoisted identifiers to the downstream devices and tunnels during configuration. A hoisted identifier uses a common bus number concatenated with an unassigned function number that is used for packet routing. The hoisted identifier is assigned during the configuration process. By pairing a common bus number with an unassigned device number to identify each bridge and device with a hoisted identifier, system 300 conserves bus numbers and therefore allows more devices to dynamically connect to system 300 without having to perform a new system configuration.

In the example illustrated in FIG. 3, root complex 310 assigns bus number 1 and function 0 (1.0) to device 340. However root complex 310 also assigns bus number 1 to downstream bridges 320, 322, 332, and 334. To properly route packets through system 300, root complex 310 assigns unassigned function numbers to bridges 322, 324, 332, and 334, and bridges 322, 324, 332, and 334 use the common bus number with the unassigned function numbers to properly route PCIe packets. The PCIe standard allows 256 unique function numbers, numbered from 0-255, when Alternative Routing-ID Interpretation (ARI) is supported. The functions which can be performed by a device, such as device 340, are assigned starting with function number 0 and increasing for additional supported functions. However unlike bus numbers in complex systems, the majority of function numbers remain unused. Therefore, when tunnels support hoisted identifier capability, root complex 310 borrows unassigned function numbers, starting at function number 255, and assigns them to hoist-capable tunnels, to form a hoisted identifier. The hoist capable tunnels then route the requests based on the hoisted identifiers. System 300 uses the "white space" in the pool of available function numbers with ARI to support additional devices, without consuming many bus numbers, thereby allowing greater flexibility in system expansion.

As shown in FIG. 3, root complex 310 recognizes that all bridges between root complex 310 and device 340 are hoist capable, and assigns function numbers 254 and 255 respectively to bridges 322 and 324, respectively. Because tunnel 320 is closest to root complex 310, root complex 310 assigns the highest available function numbers to tunnel 320. In the illustrated example, tunnel 320 has two bridges so root complex 310 assigns function number 255 (the largest function number) to downstream bridge 324, and function number 254 to upstream bridge 322. Therefore bridge 322 has a hoisted identifier of 1.254 and bridge 324 has a hoisted identifier of 1.255. Enumerating system 300 downward, root complex 310 assigns function numbers 252 and 253, the next highest unassigned function numbers below 254, respectively to bridges 332 and 334 in tunnel 330. Root complex 310 assigns the higher of the two function numbers to downstream bridge 332, in this example function number 253, and assigns the lower of the two function numbers, in this example 252, to downstream bridge 332. Thus bridge 332 has a hoisted identifier of 1.252 and bridge 334 has a hoisted identifier of 1.253.

Thus in tunnel 320, bridge 322 has a bus.function number hoisted from 1.0 to 1.254, and downstream bridge 324 has a bus.function number hoisted from 2.0 to 1.255. In tunnel 330, bridge 332 has a bus.function number hoisted from 3.0 to 1.252, and downstream bridge 334 has a bus.function number hoisted from 4.0 to 1.253.

Before assigning hoisted identifiers, root complex 310 checks the extended capabilities of all downstream devices and tunnels in the communication path between the downstream devices and root complex 310. If all the downstream devices and tunnels include the hoisted identifier extended capability descriptor and root complex 310 is configured to utilize the hoisted identifier capability, then root complex 310 sets an enable field in a hoisted identifier extended capability descriptor for each of the downstream devices and tunnels, in a manner to be described further below.

For communication links which include devices and tunnels with the hoisted identifier extended capability, root complex 310 assigns a bus number to the first downstream device, in the illustrated example bus number 1 to device 340. Each of the bridges between device 340 and root complex 310 on the communication link captures the bus number assigned to device 340 and, therefore, has the same bus number. Root complex 310 also assigns function numbers to each tunnel, based on the number of bridges within the tunnel.

During configuration, hoist capable bridges in system 300 respond to Type 1 configuration requests by routing them and converting them to Type 0 configuration requests as specified in the existing PCIe standard.

However hoist capable bridges in system 300 process Type 0 configuration requests as follows. Each hoist capable bridge has a special configuration bit known as a "Hoist Enable" bit. If the Hoist Enable bit for a hoist capable bridge is clear, or if the function number of a Type 0 configuration request matches an existing un-hoisted function, then the hoist capable bridge responds to the Type 0 configuration request as specified in the existing PCIe standard. If the Hoist Enable bit is set, the hoist capable bridge's response to a Type 0 configuration request is as follows. If the function number of the request is between the upstream bridge's function number and the upstream bridge's function number plus a downstream bridge count (i.e. the total number of downstream bridges), then the request is routed to the bridge with a function number matching the function number of the request. If exactly one hoisted downstream bridge has a secondary bus number matching the captured bus number, and the function number is less than a value known as a Hoist Function Base, then the bridge routes the Type 0 configuration request on the associated link. If none of these conditions are met, the hoist capable bridge returns an error packet.

After configuration, system 300 routes packets as defined in the existing PCIe standard for address-based transaction layer packet (TLP) routing, I/O-based TLP routing, and message routing (except for packets routed by ID-based routing). Hoisting also does not affect interrupts, power management, locked transactions, error management, and multicast routing.

However hoisting does affect ID-based routing in switches. If the function of the request matches the hoist function base, then the packet is routed and claimed by the upstream bridge. If the function of the request falls within a range between the hoist function base plus 1 and the hoist function base plus the Last Downstream Bridge, then the bridge routes the packet to the appropriate downstream bridge. If neither of these conditions is true, then the upstream bridge routes the packet to the appropriate downstream port as defined in the existing PCIe standard.

Hoist capable bridges 320 and 330 also support access control services (ACS) source validation, but with changes related to the use of hoisted identifiers. In tunnel 330, bridge 334 would reject 1.253 from below and tunnel 332 would reject 1.252 from below. In tunnel 320, bridge 324 would reject 1.255 from below and bridge 322 would reject 1.254 from below.

Figure 4:
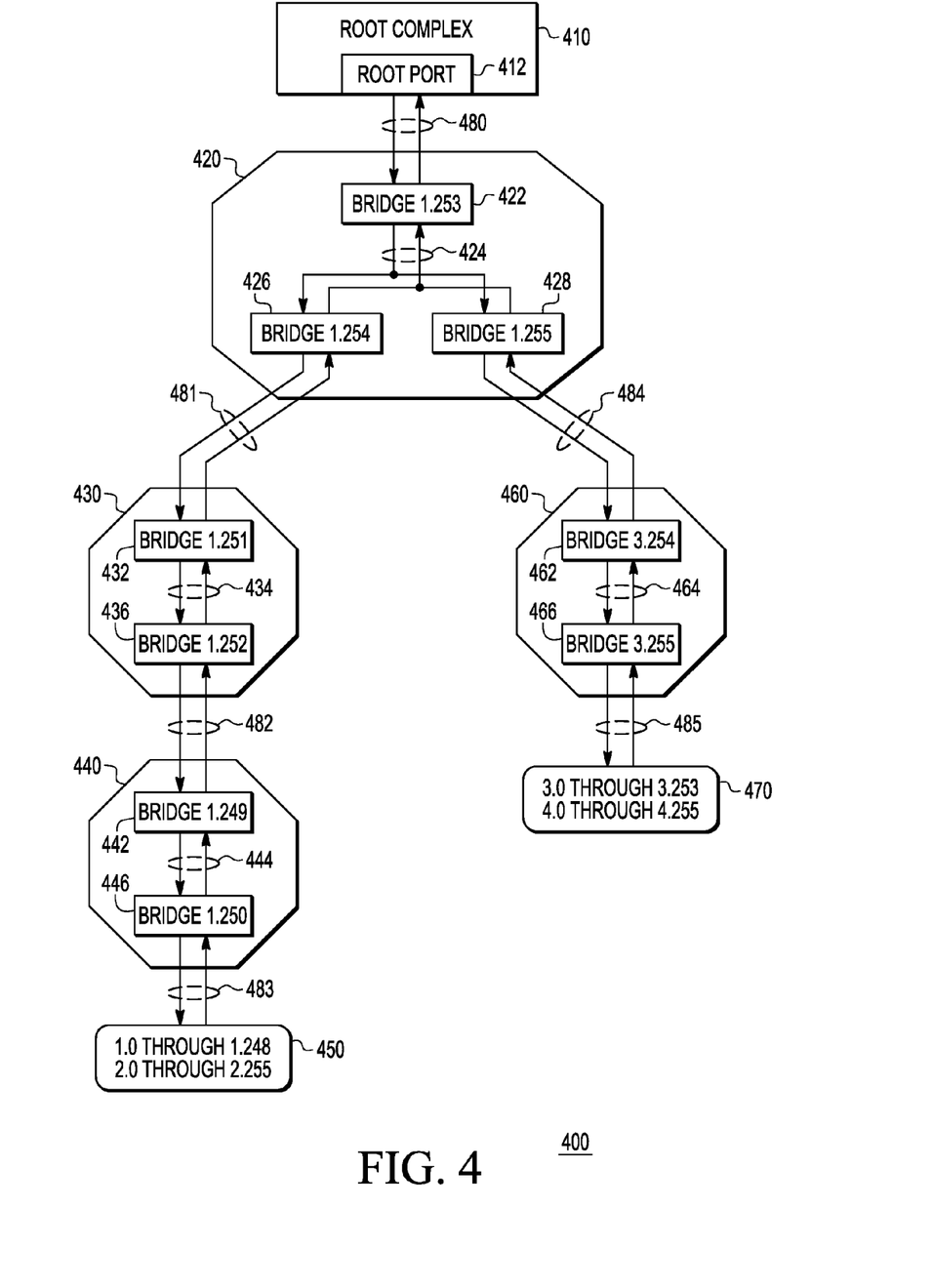
FIG. 4 illustrates in block diagram form a more complex multi-segment link system useful in understanding the assignment of hoisted identifiers, according to some embodiments.

FIG. 4 illustrates in block diagram form a more complex multi-segment link system 400 useful in understanding the assignment of hoisted identifiers, according to some embodiments. System 400 includes generally a root complex 410, tunnels 420, 430, 440, and 460, and devices 450 and 470. Root complex 410 includes a root port 412 for connection to a downstream PCIe link 480.

Tunnel 420 includes an upstream bridge 422, an internal bus 426, and downstream bridges 426 and 428. Bridge 422 has an upstream port connected to PCIe link 480, and a downstream port connected to internal bus 424. Downstream bridge 426 has an upstream port connected to internal bus 424, and a downstream port connected to a PCIe link 481. Downstream bridge 428 has an upstream port connected to internal bus 423, and a downstream port connected to a PCIe link 484.

Tunnel 430 includes an upstream bridge 432, an internal bus 434, and a downstream bridge 436. Bridge 432 has an upstream port connected to PCIe link 481, and a downstream port connected to internal bus 434. Downstream bridge 436 has an upstream port connected to internal bus 434, and a downstream port connected to a PCIe link 482.

Tunnel 440 includes an upstream bridge 442, an internal bus 444, and a downstream bridge 444. Bridge 442 has an upstream port connected to PCIe link 482, and a downstream port connected to internal bus 444. Downstream bridge 446 has an upstream port connected to internal bus 443, and a downstream port connected to a PCIe link 483.

Device 450 has a port connected to PCIe link 483. Device 450 is representative of a set of devices connected directly or indirectly to PCIe link 483.

Tunnel 460 includes an upstream bridge 462, an internal bus 464, and a downstream bridge 466. Bridge 462 has an upstream port connected to PCIe link 484, and a downstream port connected to internal bus 464. Downstream bridge 466 has an upstream port connected to internal bus 464, and a downstream port connected to a PCIe link 485.

Device 470 has a port connected to PCIe link 485. Device 470 is representative of a set of devices connected directly or indirectly to PCIe link 485.

TABLE I summarizes the assignment of hoisted identifiers to the ports of system 400, in which the hoisted identifiers are expressed in bus.function format, and "ARI" represents Alternative Routing-ID Interpretation, which allows an expansion of support to up to 255 functions by the elimination of device numbers:

TABLE I

| Port (bus.function) | Captured Bus Number | Secondary Bus Number | Subordinate Bus Number | Hoist Enable | Hoist Base Address | ARI |
|---|---|---|---|---|---|---|
| Root | N/A | 1 | 4 | N/A | N/A | YES |
| Bridge 422 (1.253) | 1 | 1 | 4 | YES | 253 | N/A |
| Bridge 426 (1.254) | N/A | 1 | 2 | N/A | N/A | YES |
| Bridge 428 (1.255) | N/A | 3 | 4 | N/A | N/A | YES |
| Bridge 432 (1.251) | 1 | 1 | 2 | YES | 251 | N/A |
| Bridge 436 (1.252) | N/A | 1 | 2 | N/A | N/A | YES |
| Bridge 442 (1.249) | 1 | 1 | 2 | YES | 249 | N/A |
| Bridge 446 (1.250) | N/A | 1 | 2 | N/A | N/A | YES |
| Bridge 462 (3.254) | 3 | 3 | 4 | YES | 254 | N/A |
| Bridge 466 (3.255) | N/A | 3 | 4 | N/A | N/A | YES |

In operation, root complex 410 assigns device 450 a bus number of 1. Device 450 is further shown as encompassing another device having bus number 2, such that bus numbers 1 and 2 are assigned to the multi-segment communication link. Root complex 410 also assigns device 470 a bus number of 3, the next available bus number after 1 and 2 which were assigned to the first branch of the communication link, and device 480 is further shown as encompassing another device having bus number 4, such that bus numbers 3 and 4 are assigned to the multi-segment communication link.

Root complex 410 assigns bus number 1 to bridges 422, 426, 428, 432, 436, 442, and 446, because tunnels 420, 430, and 440 are on a communication link between root complex 410 and device 440. Bridges 422, 424, and 426 all have the same bus number even though bridges 424 and 426 are on different branches of the communication link because all bridges within a tunnel have the same bus number when the hoisted identifier capability is enabled.

Root complex 410 also assigns function numbers to bridges 422, 426, 428, 432, 436, 442, and 446 to ensure proper routing of requests within their respective tunnels. Root complex 410 assigns bridge 422 a function number of 253, bridge 426 a function number of 254, bridge 428 a function number of 255, bridge 432 a function number of 251, bridge 436 a function number of 252, bridge 442 a function number of 249, and bridge 446 a function number of 250.

Root complex 410 assigns bus number 3 to bridges 462 and 466, because tunnel 460 is on a communication link between root complex 410 and device 470. Root complex 410 assigns hoisted identifiers 3.254 and 3.255 to bridges 462 and 466.

Figure 5:
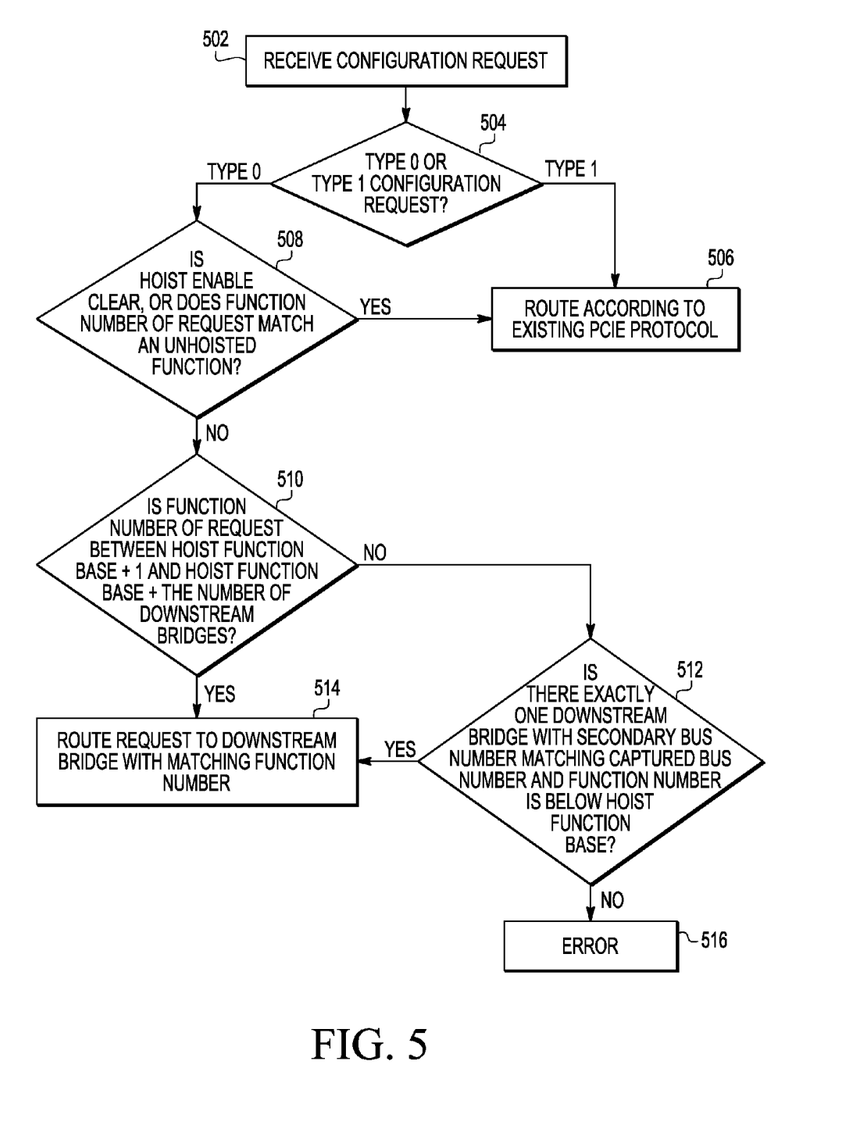
FIG. 5 illustrates a flow diagram of a method for routing configuration requests in a tunnel with the hoist bus number extended capability enabled, according to some embodiments.

FIG. 5 illustrates a flow diagram of a method 500 for routing configuration requests in a tunnel with the hoisted identifier extended capability enabled, according to some embodiments. At action box 502, the tunnel receives a configuration request, and method 500 proceeds to a decision box 504. At decision box 504, the tunnel determines whether the request is a Type 1 or Type 0 configuration request. If the request is a Type 1 configuration request, then method 500 proceeds to action box 506 and the tunnel routes the request according to standard PCIe protocol. However, if the request is a Type 0 configuration request, then method 500 proceeds to decision box 508 and the tunnel determines whether either the Hoist Enable field is clear, or the request matches an existing un-hoisted function. If either of these conditions is true, then method 500 proceeds to action box 506 and the tunnel routes the request according to standard PCIe protocol. If not, then method 500 proceeds to decision box 510.

At decision box 510, the tunnel determines whether the function number of the request is between a hoist function base plus one, and the hoist function base plus the count of downstream bridges, inclusive. The count of downstream bridges can be determined by checking the downstream bridges field in the hoisted extended capability descriptor, as will be described more fully below.

If the request's function number is between the hoist function base plus one and the hoist function base plus the count of downstream bridges, then method 500 proceeds to action box 514 and the tunnel routes the request to the downstream bridge that has a function number that matches the request's function number. However, if the function number is not between the hoist function base plus one and the hoist function base plus the count of downstream bridges, then the flow proceeds to decision box 512. In decision box 512, if the tunnel has one downstream bridge, the tunnel checks to see if the downstream bridge has a function number that matches the function number of the request. If so, then method 500 proceeds to step 514 again and the tunnel routes to the downstream bridge. Otherwise the flow proceeds to step 516 and returns an error.

Figure 6:
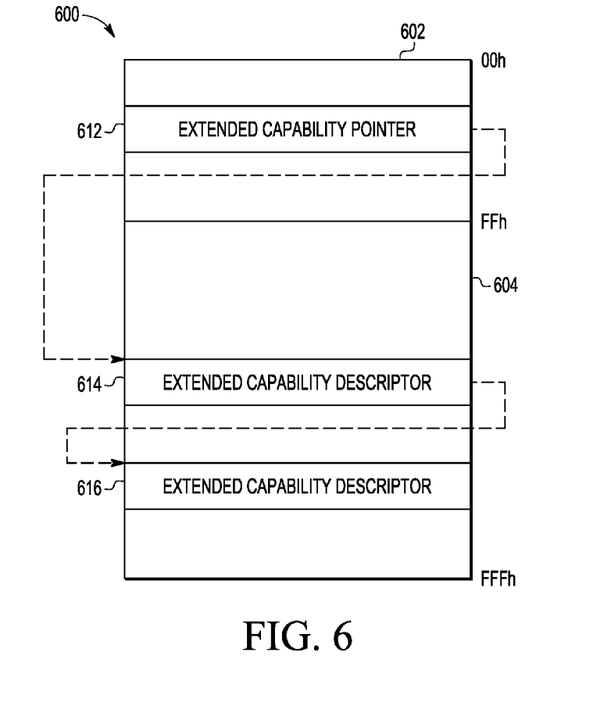
FIG. 6 illustrates in block diagram form a PCIe configuration space, according to some embodiments.

FIG. 6 illustrates in block diagram form a PCIe configuration space 600, according to some embodiments. Configuration space 600 extends from 00h to FFFh and includes a legacy PCI configuration space 602 and an extended configuration space 604. PCI configuration space 602 extends from 00h to FFh and includes an extended capability pointer 612. According to the PCIe standard, extended configuration space 604 allows for the implementation of extended capability descriptors, such as extended capability descriptors 614 and 616 illustrated in FIG. 6

Extended capabilities are additional capabilities beyond the original set included in the legacy PCI standard. PCIe implements extended capabilities through extended capability descriptors located in extended configuration space 604. Extended capability pointer 612 is included in PCI configuration space 602 and points to the first extended capability descriptor in extended configuration space 604. If the device supports further extended capabilities, then existing extended capability descriptors point to further extended capability descriptors to form a linked list. When determining capabilities of a PCIe bridge or device, the root complex reads the descriptors in the linked list starting with the first extended capability descriptor identified by extended capability pointer 612.

Figure 7:
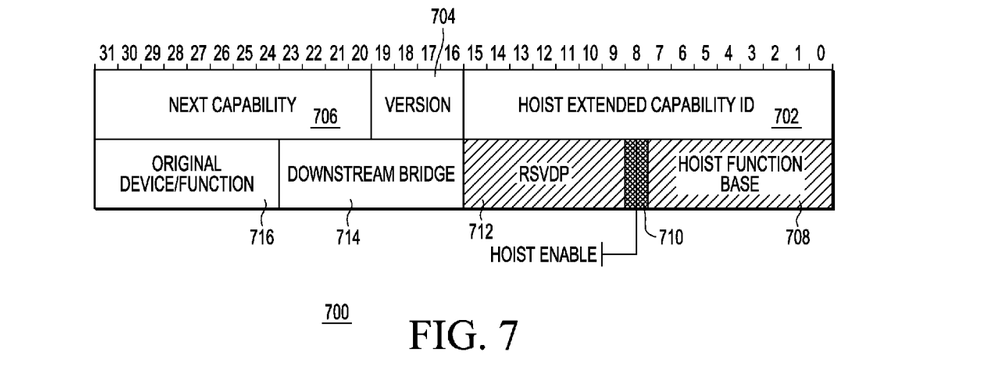
FIG. 7 illustrates in block diagram form a hoisted identifier extended capability descriptor, according to some embodiments.

FIG. 7 illustrates in block diagram form a hoisted identifier extended capability descriptor 700, according to some embodiments. Descriptor 700 includes various read/write fields including a Hoist Extended Capability identifier (ID) field 702, a Version field 704, a Next Capability field 706, a Hoist Function Base field 708, a Hoist Enable field 710, a set of reserved bits 712 labeled "RsvdP" for "reserved and preserved", a Downstream Bridge field 710, and an Original Device/Function field 708.

Hoist Extended Capability ID field 702 contains an identifier used by the root complex to identify the extended capability descriptor as a hoist extended capability descriptor. Version field 704 contains a 4-bit version number for the hoisted identifier extended capability that the device is compatible with. Next Capability field 706 contains a 12-bit pointer to a next extended capability descriptor, if any, as discussed with respect to FIG. 6 above. Hoist Function Base field 708 is an 8-bit read/write field that stores the Hoist Function Base. For example in the case of tunnel 420 of FIG. 4, the hoist function base is 253. For tunnel 420, the upstream bridge hoists to 1.253, and the downstream bridges hoist to 1.254 and 1.255. In general, the upstream port hoists to the captured bus number and the hoist function base, and the downstream ports hoist to the captured bus number and the hoist function base plus one plus the index of the downstream bridge. Thus bridge 426 is bridge 0 and hoists to 1.(253+1+0)=1.254, and bridge 424 is bridge 1 in tunnel 420 and hoists to 1.(253+1+1)=1.255.

Hoist Enable field 710 is a one-bit read/write field that is meaningful only on the upstream port and which the root complex sets to enable the use of hoisted identifiers. Downstream Bridge field 714 is a read-only field whose function varies based on whether the port is an upstream port or a downstream port. If the port is an upstream port, then Downstream Bridge field 714 indicates the number of the last downstream bridge in the tunnel, and is an integer from 0 to N. For example, the Downstream Bridge field of tunnel 420 of FIG. 4 would be 1 because it includes downstream bridge 426 (bridge number 0) and downstream bridge 428 (bridge number 1). If the port is a downstream port, then Downstream Bridge field 714 indicates the index of the bridge. For example, bridge 426 would be bridge 0 and bridge 428 would be bridge 1. Finally, Original Device/Function field 716 is a read-only field that is meaningful for both upstream and downstream ports and contains the original device and function number of the device before hoisting. Note that descriptor 700 includes a set of reserved bits 712 in bits 9-15 of the second double word.

It should be appreciated that the bit assignments and lengths of various fields of descriptor 700 may vary in other embodiments.

Abstract Links

In order to overcome the arbitrary association of non-PCIe links to existing PCIe capabilities, it is more efficient to explicitly define the association so that new software can better configure the link to take into account the characteristics of the non-PCIe segment. In some embodiments, an extended capability descriptor, known as the abstract link extended capability descriptor, is used in tunnels that support PCIe links having segments with differing capabilities as well as non-PCIe segments. The tunnel can add this new descriptor to the linked list of extended capability descriptors as illustrated previously in FIG. 6 above. Note that while the abstract link extended capability descriptor is particularly useful for multi-segment links having a non-PCIe segment, it is also useful in describing to the root complex the characteristics of standard PCIe links as well.

Figure 8:
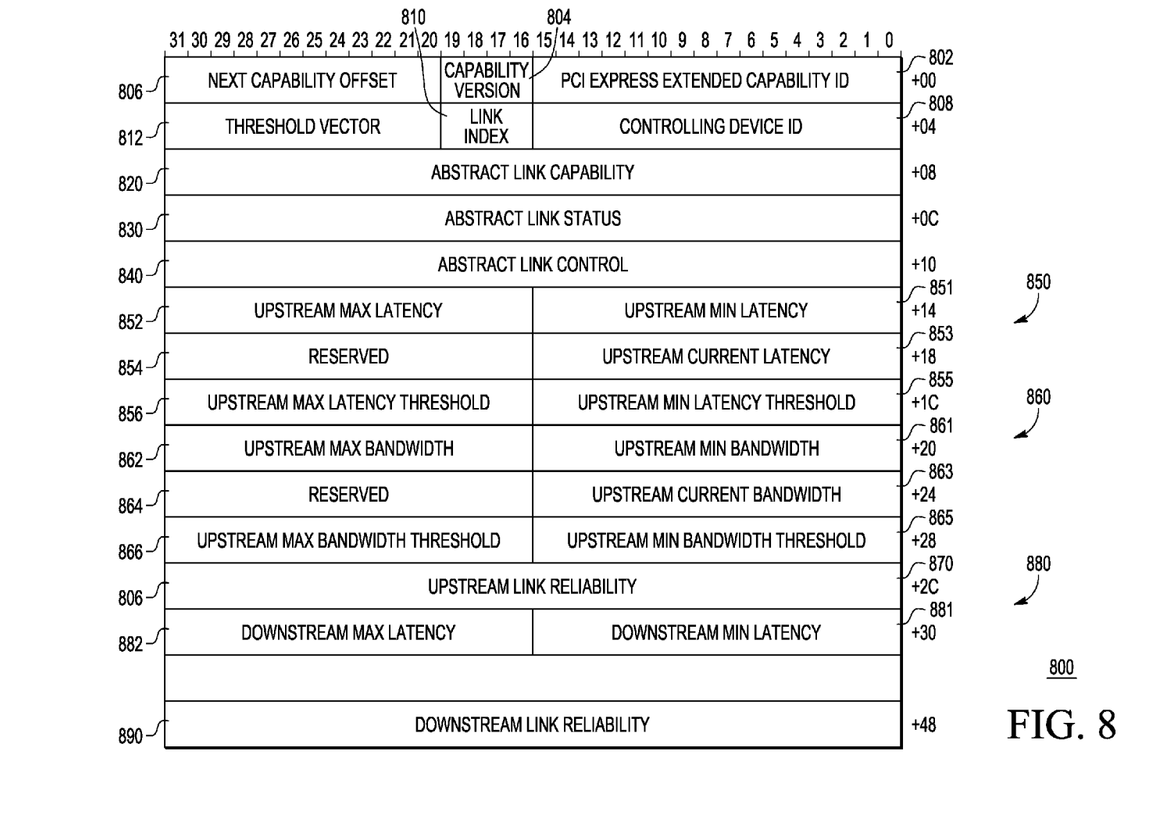
FIG. 8 illustrates in block diagram form an abstract link extended capability descriptor, according to some embodiments.

FIG. 8 illustrates in block diagram form an abstract link extended capability descriptor 800, according to some embodiments. Descriptor 800 includes various fields as shown, each having a byte offset from a base address of the descriptor. To simplify software, descriptor 800 is used only for downstream bridges. Abstract link extended capability descriptor 800 includes various read/write fields that will be described below.

At offset +00h, descriptor 800 includes an Abstract Link Extended Capability ID field 802 in bits 0-15, which identifies this extended capability descriptor as being an abstract link extended capability descriptor; a Capability Version field 804 in bits 16-19, which contains a 4-bit version number for the abstract link extended capability that the device is compatible with; and a Next Capability Offset field 806 in bits 20-31 that contains a 12-bit pointer to a next extended capability descriptor, if any, as discussed with respect to FIG. 6 above.

At offset +04h, descriptor 800 includes a Controlling Device ID field 808 in bits 0-15, which is the bus number of the device that controls the non-PCIe link portion; a Link Index field 810 in bits 16-19, containing a 4-bit link index value; and a Threshold Vector field 812 in bits 20-31 that defines the interrupt vector to be used by the root complex with respect to the communication link.

At offset +08h, descriptor 800 includes an Abstract Link Capability Register 820. At offset +0Ch, descriptor 800 includes an Abstract Link Status Register 830. At offset +10h, descriptor 800 includes an Abstract Link Control Register 840. Abstract Link Capability Register 820, Abstract Link Status Register 830, and Abstract Link Control Register 840 will each be described further below.

Abstract link extended capability descriptor 800 also includes a set of upstream latency fields 850, including an Upstream Minimum Latency field 851 in bits 0-15 at offset +14h, an Upstream Maximum Latency field 852 in bits 16-31 at offset +14h, an Upstream Current Latency field 853 in bits 0-15 at offset +18h, an Upstream Minimum Latency Threshold field 855 in bits 0-15 at offset +1Ch, an Upstream Maximum Latency Threshold field 856 in bits 16-31 at offset +1Ch. The format for each of latency fields 850 will be described further below.

Abstract link extended capability descriptor 800 also includes a set of upstream bandwidth fields 860, including an Upstream Minimum Bandwidth field 861 in bits 0-15 at offset +20h, an Upstream Maximum Bandwidth field 862 in bits 16-31 at offset +20h, an Upstream Current Bandwidth field 863 in bits 0-15 at offset +24h, an Upstream Minimum Bandwidth Threshold field 865 in bits 0-15 at offset +28h, and an Upstream Maximum Bandwidth Threshold field 866 in bits 16-31 at offset +14h. The format for each of bandwidth fields 860 will be described further below.

At offset +2Ch, descriptor 800 includes an Upstream Link Reliability register 870.

At offset +30h, descriptor 800 includes a set of downstream latency fields 880, including a Downstream Minimum Latency field 881 in bits 0-15 at offset +30h, and a Downstream Maximum Latency field 882 in bits 16-31. These fields have the same format as latency fields 850 and will be described below.

Finally at offset +48h, descriptor 800 includes a downstream link reliability register 890. The format of both Upstream Link Reliability Register 870 and Downstream Link Reliability register 890 will be described below.

Descriptor 800 also includes reserved bits in bits 15-31 of offset +18h and offset +24h, as well as double words beginning at +34h and extending through +44h. In other embodiments, these reserved fields may be used to explicitly describe further characteristics of the upstream and downstream links.

During configuration, the root complex accesses descriptor 800 of a tunnel that supports this feature. The root complex uses the various link parameters to configure the PCIe link, and treats the downstream link as a PCIe link with characteristics matching the parameters. For example, based on the latency and bandwidth thresholds of the downstream link or links, the root complex configures the speed and the width (number of lanes) for the upstream PCIe link. For tunnels with non-PCIe downstream links, the root complex is able to better configure the upstream link to match the characteristics of the downstream link, instead of "lying" by associating it with a known PCIe configuration.

Figure 9:
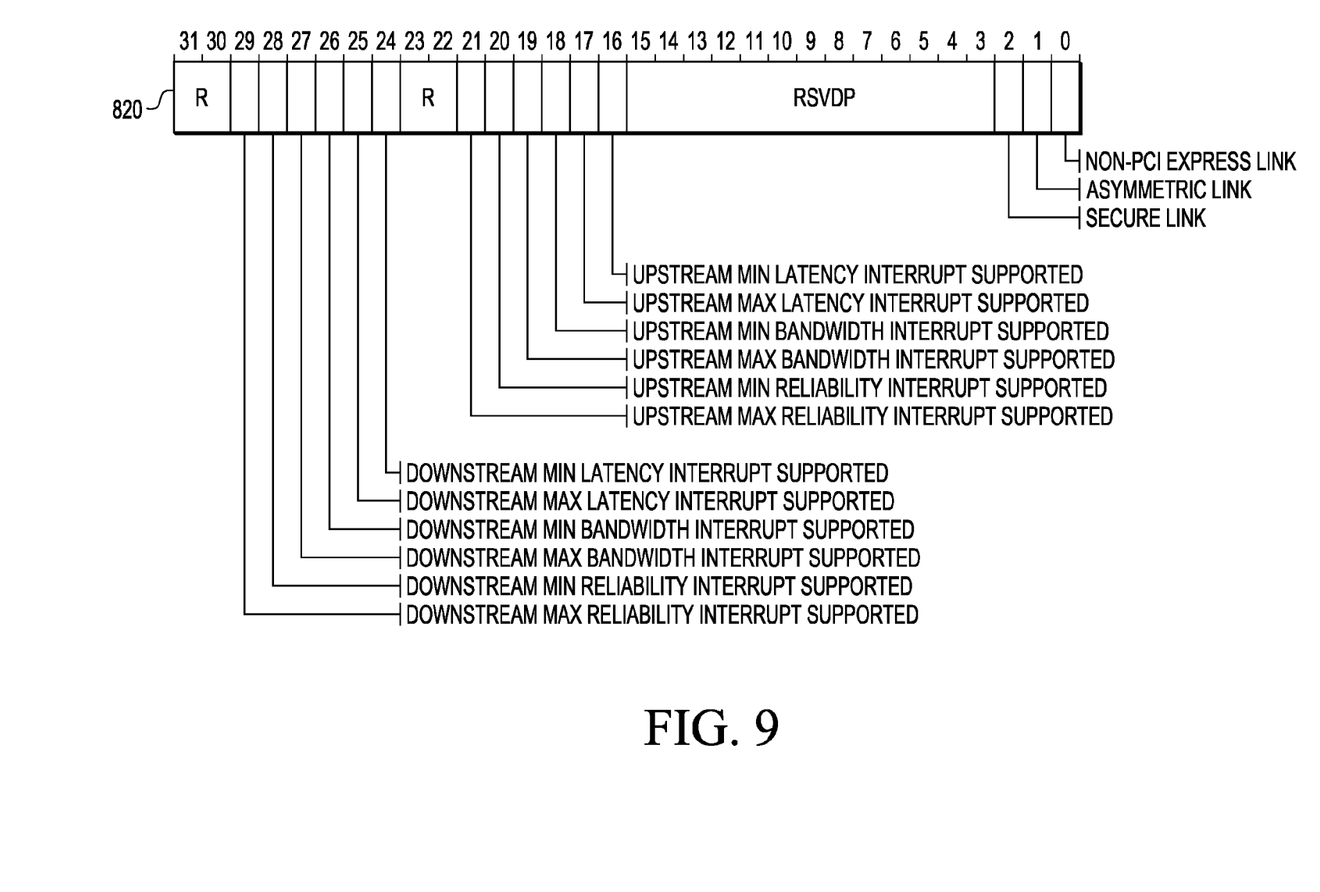
FIG. 9 illustrates in block diagram form the abstract link capability register of the descriptor of FIG. 8, according to some embodiments.

FIG. 9 illustrates in block diagram form abstract link capability register 820 of descriptor 800 of FIG. 8, according to some embodiments. Abstract link capability register 820 is formed by one double word at offset +08h from the base address of abstract link extended capability descriptor 800. Bit 0 includes a status bit that indicates whether the link is a non-PCI Express link, in which a value of 0b indicates a PCI Express link and a value of 1b indicates a non-PCI Express link. Bit 1 indicates whether the link is asymmetric, in which a value of 0b indicates that the downstream and upstream ports have the same characteristics and a value of 1b indicates that the downstream and upstream ports have different characteristics. Bit 2 indicates whether the link is secure, in which a value of 0b indicates that the link is unsecure, and a value of 1b indicates that the link is secure, such as a secure wireless link. Bits 3-15 are reserved.

The upper 16 bits of abstract link capability register 820 generally indicate whether various fields of descriptor 800 are supported, in which a value of 0b indicates that the field is not supported, and a value of 1b indicates that the field is supported. The meaning of these fields will be described further below. The remaining bits of abstract link capability register 810, bits 22, 23, 30, and 31, are reserved.

Figure 10:
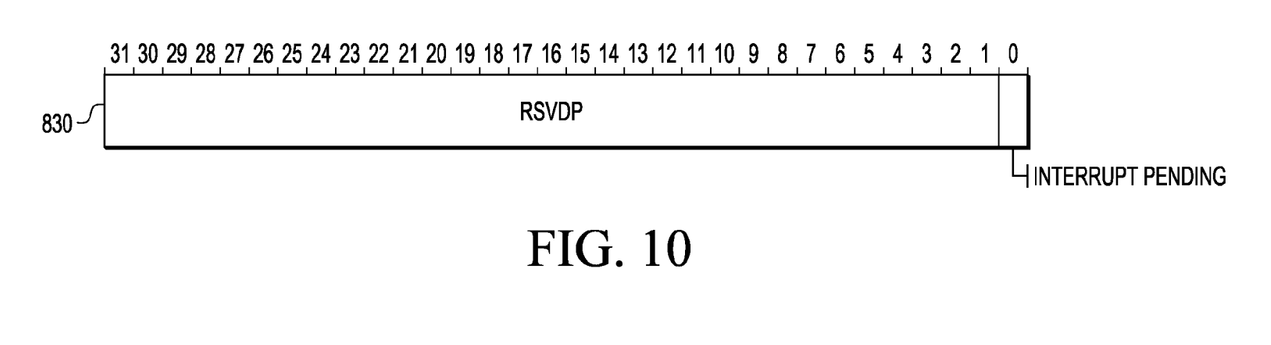
FIG. 10 illustrates in block diagram form the abstract link interrupt control register of the descriptor of FIG. 8, according to some embodiments.

FIG. 10 illustrates in block diagram form abstract link status register 830 of descriptor 800 of FIG. 8, according to some embodiments. Abstract link status register 830 is formed by one double word at offset +0Ch from the base address of descriptor 800. Bit 0 includes a read-only Interrupt Pending bit that indicates whether an interrupt is pending, in which a value of 0b indicates that an interrupt is not pending, and a value of 1b indicates an interrupt is pending. The remaining bits of abstract link status register 830, bits 1-31, are reserved.

Figure 11:
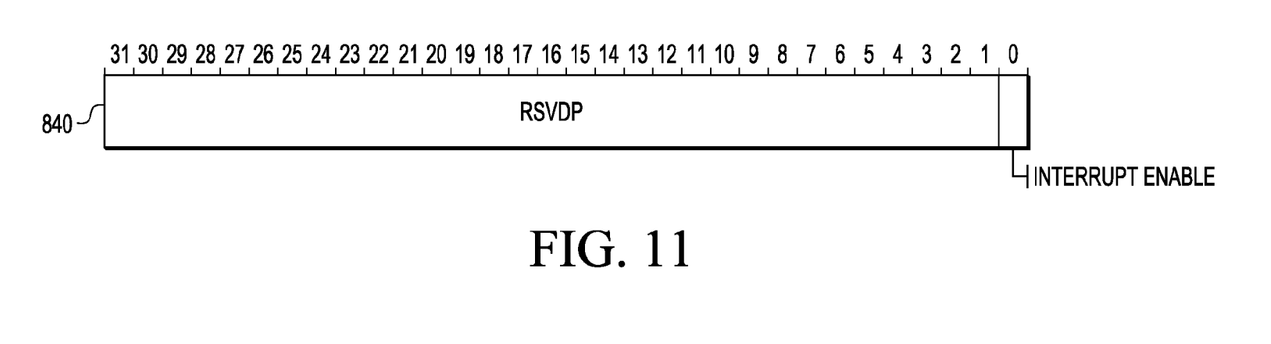
FIG. 11 illustrates in block diagram form the abstract link control register of the descriptor of FIG. 8, according to some embodiments.

FIG. 11 illustrates in block diagram form abstract link control register 840 of descriptor 800 of FIG. 8, according to some embodiments. Abstract Link Control register 840 is formed by one double word at offset 10h from the base address of descriptor 800. Bit 0 includes a read-write interrupt enable bit that indicates whether interrupts are enabled, in which a value of 0b indicates that interrupts are not enabled and a value of 1b indicates interrupts are enabled. The remaining bits of abstract link control register 840, bits 1-31, are reserved.

Figure 12:
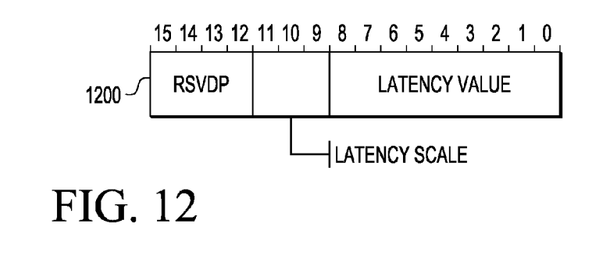
FIG. 12 illustrates an encoding of the latency field of the abstract link extended capability descriptor of FIG. 8, according to some embodiments.

FIG. 12 illustrates an encoding of a latency field 1200 of abstract link extended capability descriptor 800 of FIG. 8, according to some embodiments. Latency field 1000 represents the format of any of Upstream Min Latency field 851, Upstream Max Latency field 852, Upstream Current Latency field 853, Upstream Min Latency Threshold field 855, Upstream Max Latency Threshold field 856, Downstream Min Latency field 881, and Downstream Max Latency field 882 of Abstract Link Extended Capability Register 800. Latency Field 1200 includes a Latency Value in bits 0-8 and a Latency Scale in bits 9-11. Bits 12-15 are reserved. The Latency Value is a binary value having a range from 0 to 511. The Latency Scale is defined by TABLE II below:

TABLE II

| Scale | Multiplier |
|---|---|
| 0 | 1 ps |
| 1 | 32 ps |
| 2 | 1,024 ps |
| 3 | 32,768 ps |
| 4 | 1,048,576 ps |
| 5 | 33,554,432 ps |

TABLE II-continued

| Scale | Multiplier |
| --- | --- |
| 6 | 1,073,741,824 ps |
| 7 | 34,359,738,368 ps | in which ps represents time in picoseconds. The corresponding latency is equal to the Latency Value times the Latency Scale. Encoding 1200 also uses a special encoding for bits 0-11, in which a value of 000h means zero and a value of FFFh means infinity.

The Max and Min Latency fields are read-only fields that define the upper and lower bounds for the Current Latency. The PCIe root complex interprets the Max and Min Latency values as being the upper and lower bounds, respectively, for the Current Latency. The Current Latency field is a read-only field that indicates the current value. The Max and Min Latency Threshold fields are optional, read-write fields that determine when the tunnel will generate interrupts (if interrupts are enabled). The tunnel will generate an interrupt if either the Current Latency exceeds the Max Latency Threshold, or the Current Latency is less than the Min Latency Threshold.

Figure 13:
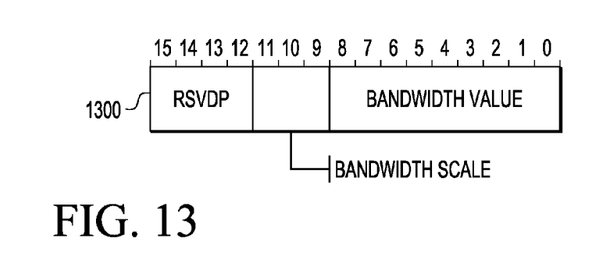
FIG. 13 illustrates an encoding of a bandwidth field of the abstract link extended capability descriptor of FIG. 8, according to some embodiments.

FIG. 13 illustrates an encoding 1300 of a bandwidth field of abstract link extended capability descriptor 800 of FIG. 8, according to some embodiments. Encoding 1300 represents the format of any of Upstream Min Bandwidth 861, Upstream Max Bandwidth 862, Upstream Current Bandwidth 863, Upstream Min Bandwidth Threshold 865, and Upstream Max Bandwidth Threshold 866 of Abstract Link Capability descriptor 800. Encoding 1300 includes a Bandwidth Value in bits 0-8 and a Bandwidth Scale in bits 9-11. Bits 12-15 are reserved. The Bandwidth Value is a binary value having a range from 0 to 511. The Bandwidth Scale is defined by TABLE III below:

TABLE III

| Scale | Multiplier |
| --- | --- |
| 0 | 1 kbps |
| 1 | 32 kbps |
| 2 | 1,024 kbps |
| 3 | 32,768 kbps |
| 4 | 1,048,576 kbps |
| 5 | 33,554,432 kbps |
| 6 | 1,073,741,824 kbps |
| 7 | 34,359,738,368 kbps | in which kbps represents the bandwidth in kilobits per second. The actual bandwidth is then equal to the Bandwidth Value times the Bandwidth Scale. Encoding 1300 also uses a special encoding for bits 0-11, in which a value of 000h means zero, and a value of FFFh means infinity.

The Max and Min bandwidth fields are read-only fields that define the upper and lower bounds for the Current Bandwidth. The Current Bandwidth field is a read-only field that indicates the current value. The Max and Min Bandwidth Threshold fields are optional, read-write fields that determine when the tunnel will generate interrupts (if interrupts are enabled). The tunnel will generate an interrupt if either the Current Bandwidth exceeds the Max Bandwidth Threshold or the Current Bandwidth is less than the Min Bandwidth Threshold.

Figure 14:
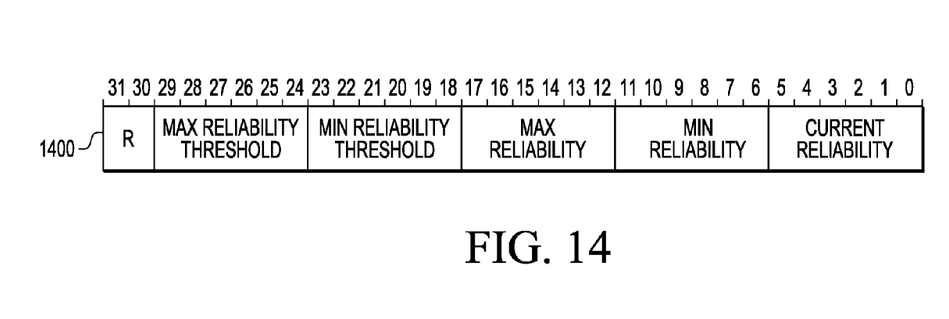
FIG. 14 illustrates an encoding of a link reliability field of the abstract link extended capability descriptor of FIG. 8, according to some embodiments.

FIG. 14 illustrates an encoding 1400 of a link reliability field of abstract link extended capability descriptor 800 of FIG. 8, according to some embodiments. Encoding 1400 represents the format of either of Upstream Link Reliability field 870 or Downstream Link Reliability field 890. Encoding 1400 includes a Current Reliability field in bits 0-6, a minimum (Min) Reliability field in bits 6-11, a maximum (Max) Reliability field in bits 12-17, a Min Reliability Threshold field in bits 18-23, and a Max Reliability Threshold field in bits 24-29. Bits 30 and 31 are reserved.

The Current Reliability field is a read-only field that represents the current reliability, expressed as a bit-error rate (BER). The Min Reliability field and the Max Reliability field are read-only fields that represent the bounds for the Current Reliability. The Min Reliability Threshold and Max Reliability Threshold fields are read-write fields that determine when the tunnel will generate interrupts (if interrupts are enabled). The tunnel will generate an interrupt if either the Current Reliability exceeds the Max Reliability Threshold or the Current Reliability is less than the Min Reliability Threshold. Each of these fields is encoded as a two's complement number in which the value of 00h represents a nominal reliability of $1 \times 10^{-12}$, positive numbers mean better reliability (e.g. 1 means $1 \times 10^{-13}$), and negative numbers represent worse reliability (e.g. −1 means $1 \times 10^{-11}$).

A PCIe system can use the Abstract Link Extended Capability Descriptor to identify certain characteristics of the link such as bandwidth and latency so that the root complex can better associate a set of PCIe link parameters with a multi-segment link having a non-PCIe segment. In this way, the Abstract Link Extended Capability Descriptor helps to implement multi-segment links. In addition to latency and bandwidth, the Abstract Link Extended Capability Descriptor optionally supports interrupts for values of interesting parameters (bandwidth, latency, and reliability) that fall outside software-defined thresholds.

According to one aspect of the disclosed embodiments, a method of configuring a tunnel of a communication system includes assigning a first bus number as a programmable bus number of a first bridge of the tunnel; assigning a hoist function base as a programmable function number of the first bridge; assigning the first bus number as a programmable bus number of a second bridge coupled to the first bridge; and assigning a hoist function base plus a predetermined number as a programmable function number of the second bridge of the tunnel. In some embodiments, the assigning the hoist function base plus the predetermined number comprises assigning the hoist function base plus one as the programmable function number of the second bridge. In these embodiments, the method may further include assigning the first bus number to a third bridge of the tunnel; and assigning a second function number equal to the hoist function base plus two to the third bridge of the tunnel. In some embodiments, the method may further include assigning the first bus number to a plurality of additional bridges of the tunnel; and assigning additional function numbers to corresponding ones of the plurality of additional bridges wherein each function number is equal to the hoist function base plus a number of the corresponding one of the plurality of additional bridges in a sequence of bridges.

Note that the functions of a tunnel such as tunnel 420 of FIG. 4 may be implemented with various combinations of hardware and software. Some of the software components may be stored in a computer readable storage medium for execution by at least one processor. Moreover the methods illustrated in FIG. 5 may also be governed by instructions that are stored in a computer readable storage medium and that are executed by at least one processor. Each of the operations described with respect to the tunnel or the method of FIG. 5 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, the circuits of a tunnel such as tunnel 420 of FIG. 4 may be described or represented by a computer accessible data structure in the form of a database or other data structure which can be read by a program and used, directly or indirectly, to fabricate integrated circuits with the tunnel. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising integrated circuits with the tunnel. The netlist may then be placed and routed to produce a data set describing geometric shapes to be applied to masks. The masks may then be used in various semiconductor fabrication steps to produce integrated circuits with the tunnel. Alternatively, the database on the computer accessible storage medium may be the netlist (with or without the synthesis library) or the data set, as desired, or Graphic Data System (GDS) II data.

Although the present invention has been described with reference to preferred embodiments, workers skilled in the art will recognize that changes may be made in form and detail without departing from the scope of the invention. For example, the hoisted identifier capability can be applied to other interconnection systems which have limited resource numbering besides PCIe. For non-PCIe systems, the "bus number" would represent a first identifier field and the "function number" would represent a second identifier field. Therefore it is to be understood that the invention encompasses all such modifications that do not depart from the scope of the invention as defined in the appended claims.

What is claimed is:
1. A tunnel for a communication system comprising:
a first bridge having a first port adapted to couple to a first link and a second port, and having a first programmable bus number and a first programmable function number; and
a second bridge having a first port coupled to the second port of the first bridge, and a second port, and having a second programmable bus number and a second programmable function number,
wherein in a hoist enabled mode, the first bridge forwards a packet on the first link to the second bridge if the second programmable bus number is equal to the first programmable bus number, a bus number of the packet is equal to the first programmable bus number and a function number of the packet is equal to the second programmable function number.

2. The tunnel of claim 1, wherein in a non-hoist enabled mode, the first bridge is responsive to the packet on the first link to forward the packet to the second bridge if the bus number of the packet is equal to the second programmable function number.

3. The tunnel of claim 1, wherein the first bridge selectively receives the packet using standard Peripheral Component Interconnect (PCI) Express protocol.

4. The tunnel of claim 3, wherein the first bridge captures the first programmable bus number and the first programmable function number during a Type 0 Configuration cycle.

5. The tunnel of claim 1, wherein the second bridge selectively forwards the packet using a protocol other than standard Peripheral Component Interconnect (PCI) Express protocol.

6. The tunnel of claim 1, wherein in the hoist enabled mode the first bridge selectively routes a Type 0 Configuration request to a corresponding one of a plurality of downstream bridges if a function number of the Type 0 Configuration request is between the first programmable function number plus one, and the first programmable function number plus one plus a number of the corresponding one of the plurality of downstream bridges.

7. The tunnel of claim 1, further comprising a third bridge having a first port coupled to the second port of the first bridge, and a second port, and having a third programmable bus number and a third programmable function number, wherein in the hoist enabled mode, the first bridge is responsive to the packet on the first link to forward the packet to the third bridge if the third programmable bus number is equal to the first programmable bus number, if the bus number of the packet is equal to the first programmable bus number, and if the function number of the packet is greater than the first programmable function number.

8. The tunnel of claim 1, further comprising:
a configuration space for storing configuration information for operation of the tunnel, the configuration space comprising a hoist extended capability descriptor having a hoist enable field, wherein said tunnel is responsive to the hoist enable field to enter the hoist enabled mode.

9. The tunnel of claim 8, wherein the hoist extended capability descriptor comprises:
a first field for storing an identification of the hoist extended capability descriptor; and
a second field for storing an original device and function number before hoisting.

10. The tunnel of claim 8, wherein the hoist extended capability descriptor comprises:
a third field for storing a hoist function base, wherein the first programmable function number is equal to the hoist function base, and the second programmable function number is equal to the hoist function base plus one.

11. The tunnel of claim 1, wherein said packet is characterized as being identification (ID) routed.

12. A tunnel for a communication system comprising:
an upstream bridge having a first port adapted to couple to a first link and a second port, and having a first programmable bus number and a first programmable function number; and
a plurality of downstream bridges each having a first port coupled to the second port of the upstream bridge, and a second port, and having a second programmable bus number and a second programmable function number,
wherein in a hoist enabled mode, the upstream bridge selectively routes a first type of configuration request to a corresponding one of the plurality of downstream bridges if a function number of the first type of configuration request is between the first programmable function number plus one, and the first programmable function number plus one plus a number of the corresponding one of the plurality of downstream bridges.

13. The tunnel of claim 12, wherein the first type of configuration request comprises a Type 0 Configuration request according to existing Peripheral Component Interconnect (PCI) Express protocol.

14. The tunnel of claim 12, wherein in a non-hoist enabled mode, the upstream bridge selectively routes the first type of configuration request according to existing Peripheral Component Interconnect (PCI) Express protocol.

15. The tunnel of claim 12, wherein the upstream bridge selectively routes a second type of configuration request according to existing Peripheral Component Interconnect (PCI) Express protocol.

16. The tunnel of claim 15, wherein the second type of configuration request comprises a Type 1 Configuration request according to existing Peripheral Component Interconnect (PCI) Express protocol.

17. The tunnel of claim 12, wherein in the hoist enabled mode, the upstream bridge selectively routes the first type of configuration request to a corresponding one of the plurality of downstream bridges if the function number of the first type of configuration request is not between the first programmable function number plus one, and the first programmable function number plus one plus the number of the plurality of downstream bridges, there is exactly one downstream bridge with a secondary bus number matching the first programmable bus number, and the function number is below the first programmable function number.

18. The tunnel of claim 12, wherein the upstream bridge rejects a packet received on the second port thereof with a bus number equal to the first programmable bus number and a function number equal to the first programmable function number.

19. The tunnel of claim 12, wherein each of the plurality of downstream bridges rejects a packet received on the second port thereof with a bus number equal to the second programmable bus number and a function number equal to the second programmable function number.

20. A tunnel for a communication system comprising:
a first bridge having a first port adapted to couple to a first link operating according to a first protocol, and a second port;
a second bridge having a first port coupled to the second port of the first bridge, and a second port adapted to couple to a second link according to a second protocol incompatible with the first protocol; and
a configuration space for storing configuration information for operation of the tunnel, the configuration space comprising an abstract link capability descriptor having a field for storing at least one parameter of the second protocol.

21. The tunnel of claim 20, wherein the first protocol is compatible with Peripheral Component Interconnect Express (PCIe), and the second protocol is compatible with IEEE 802.11.

22. The tunnel of claim 20, wherein the first protocol is compatible with Peripheral Component Interconnect Express (PCIe), and the abstract link capability descriptor is a PCIe extended capability descriptor.

23. The tunnel of claim 20, wherein the at least one parameter relates to one of a group consisting of: link bandwidth, link latency, link reliability, link security, and interrupt control.

24. The tunnel of claim 20, wherein the at least one parameter specifies whether or not an asymmetric link is present.

25. The tunnel of claim 24, wherein if the asymmetric link is not present, then the at least one parameter further comprises a first parameter specifying upstream maximum latency, a second parameter specifying upstream minimum latency, a third parameter specifying upstream current latency, a fourth parameter specifying an upstream maximum latency threshold, a fifth parameter specifying upstream minimum latency threshold, a sixth parameter specifying upstream maximum bandwidth, a seventh parameter specifying upstream minimum bandwidth, an eighth parameter specifying upstream current bandwidth, a ninth parameter specifying upstream maximum bandwidth threshold, a tenth parameter specifying upstream minimum bandwidth threshold, and an eleventh parameter specifying upstream link reliability.

26. The tunnel of claim 24, wherein if the asymmetric link is present, and the abstract link capability descriptor relates to an upstream port, then the at least one parameter further comprises a first parameter specifying upstream maximum latency, a second parameter specifying upstream minimum latency, a third parameter specifying upstream current latency, a fourth parameter specifying an upstream maximum latency threshold, a fifth parameter specifying upstream minimum latency threshold, a sixth parameter specifying upstream maximum bandwidth, a seventh parameter specifying upstream minimum bandwidth, an eighth parameter specifying upstream current bandwidth, a ninth parameter specifying upstream maximum bandwidth threshold, a tenth parameter specifying upstream minimum bandwidth threshold, and an eleventh parameter specifying upstream link reliability.

27. The tunnel of claim 24, wherein if the asymmetric link is present, and the abstract link capability descriptor relates to a downstream port, then the at least one parameter further comprises a first parameter specifying downstream maximum latency, a second parameter specifying downstream minimum latency, and a third parameter specifying downstream link reliability.

* * * * *